Nov. 14, 1950  P. S. DICKEY  2,530,117
FURNACE FUEL FEEDER CONTROL SYSTEM
Filed April 12, 1948

INVENTOR.
PAUL S. DICKEY
BY
Raymond D. Junkins
ATTORNEY

Patented Nov. 14, 1950

2,530,117

UNITED STATES PATENT OFFICE 2,530,117

FURNACE FUEL FEEDER CONTROL SYSTEM

Paul S. Dickey, East Cleveland, Ohio, assignor to Bailey Meter Company, a corporation of Delaware Application April 12, 1948, Serial No. 20,467

11 Claims. (Cl. 236—26)

1

This invention relates to systems for controlling the operation of a furnace, and more particularly to systems for regulating the supply of fuel and air to a furnace in response to changes in its output.

In a preferred form of my invention raw coal is withdrawn from a storage bin by a feeding means and supplied to a pulverizer mill from which pulverized coal is carried by a stream of air to the furnace of a steam generating boiler. A power unit is arranged to drive the feeding means, and the operation of this unit is determined by means responsive to pressures representative of the ratio of the flow of air and fuel relative to the pulverizer. Means responsive to the furnace output regulates the flow of air to the pulverizer, and the amount of fuel in the pulverizer as well as the rate of air flow determines the supply of fuel to the furnace. Any change in the furnace output results in a change in the ratio of air flow to fuel flow and an operation of the motor control means to vary the speed of the power unit until it operates at a speed proportional to the new flow ratio. In one form of my invention the power unit control means is made directly responsive to changes in furnace output as well as to changes in the flow of air and fuel. A change in the output with this arrangement results in an immediate adjustment of the feeder speed, and this is followed by further adjustment of speed in proportion to actual changes in the flow of air and fuel to the furnace.

An object of my invention is to provide an improved system for controlling the supply of fuel to a furnace. Another object is to provide an improved system which operates to regulate the supply of fuel to a furnace in response to changes in the furnace output. Yet another object is to provide in an improved furnace control system a fuel feeding means operating in response to changes in the ratio of air flow to fuel flow in the furnace supply line, as well as to changes in furnace output. Other objects will appear in the course of the following description.

In the accompanying drawing there are shown for purposes of illustration two forms which my invention may assume in practice.

Figure 1:
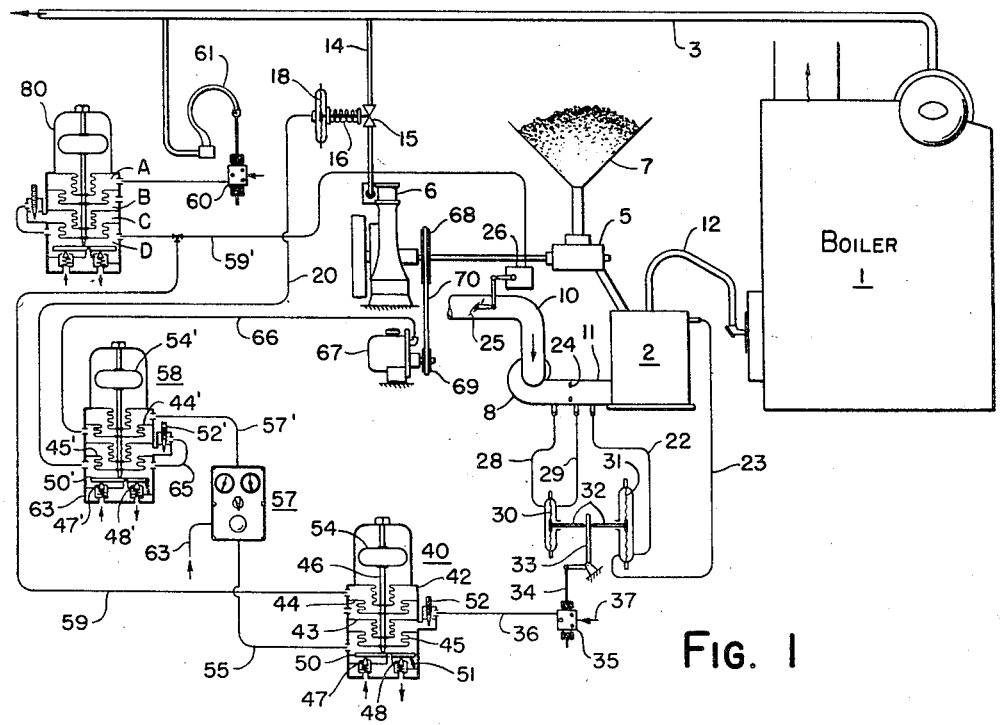
Fig. 1 is a schematic diagram showing a form of my improved system in which the furnace output acts both directly and indirectly in determining the supply of fuel.

In each of the control systems there is shown a boiler 1 having fuel supplied thereto from a pulverizer 2 for generating steam which is delivered to a point of use through a conduit 3. The pulverizer may be of the type disclosed and claimed in the patent to Bailey et al. 2,076,-288, although it is by no means limited to this particular type. A feeder 5 is driven by a power unit 6 for feeding fuel, such as raw coal, from a bin 7 to the pulverizer, and a fan 8 takes air from a conduit 10 and delivers it through a conduit 11 to the lower end of the pulverizer where it picks up the pulverized fuel as the air sweeps through the pulverizer and carries it to the furnace of the boiler through a conduit or conduits 12.

The power unit 6 is shown herein as an engine driven by steam supplied to it through a conduit 14 leading from the steam discharge line 3. The steam for operating this engine could as well be obtained from any other suitable source. The engine 6 may be subjected to an extreme variable load and the control is so arranged as to obviate overfeeding or starving of the pulverizer with raw coal. Thus the control of engine speed is preferably responsive not only to a measure of furnace demand, but also to rate of pulverizer operation and to speed of the engine. Arranged in the conduit 14 is a valve 15 normally urged toward a closed position by a spring 16 and adapted to be moved to an open position on the supply of pressure fluid to a diaphragm 18. A conduit 20 communicates with the diaphragm and conducts fluid relative to the latter under the control of mechanism which will shortly be described.

The operation of the power unit 6 in each case is controlled by regulation of the valve 15 to vary the amount of fuel in the pulverizer in such a manner that the amount of fuel carried to the furnace is sufficient to satisfy the furnace output demand. In order to obtain an indication of the rate of fuel supplied to the furnace, there are provided conduits 22 and 23 communicating with the air intake and discharge ends of the pulverizer 2. The pressure differential between these points varies with the amount of material in the pulverizer and bears a functional relation to the amount of coal in suspension passing from the pulverizer through the conduit 12 to the furnace. The connections could be made as well at different points in the supply line between the pulverizer and the furnace. The flow of air to the pulverizer is determined by measuring the pressure differential across an orifice 24 in the air supply line 11, and the flow in this line is made representative of the boiler output by positioning a damper 25 in the conduit 10 from a device 26 responsive to pressures in the conduit.

The pressures at opposite sides of the orifice 24 are subjected through conduits 28 and 29 on opposite sides of a diaphragm 30, and the pressure in conduits 22 and 23 are subjected on opposite sides of a diaphragm 31. The diaphragms 30 and 31 carry members 32 acting on opposite sides of one arm of a bell crank lever 33 which has its other arm connected to the valve stem 34 of a pilot valve 35 controlling communication of a conduit 36 with a pressure line 37 and with the atmosphere. The pilot valve is like that disclosed in the Johnson patent 2,054,464 and forms no part of my present invention. It is only necessary to point out here that an upward movement of the valve stem 34 increases communication between the conduit 36 and the pressure line 37 while decreasing its communication with the atmosphere. A downward movement of the valve stem decreases communication with the pressure line 37 and increases communication with the atmosphere.

The pressure determined in conduit 36 is subjected on a relay, generally designated 40, including a casing 42 divided between its ends by a fixed partition 43. Arranged at opposite sides of the partition are diaphragms 44 and 45 which are connected to an elongated member 46 extending longitudinally of the casing. At the lower end of the casing are valve devices 47 and 48 controlling communication with fluid supply and exhaust ports, respectively, and a pivoted beam 50 is acted upon by the member 46 and a spring 51 for controlling the positions of the valves. The pressure fluid in conduit 36 is supplied past a manually adjustable restricting valve 52 to the upper side of the diaphragm 45 where it acts to move the member 46 downwardly and effect an opening of the fluid supply valve 47. A spring 54 is connected to the member 46 and is adjustable to offer any desired opposition to downward movement of the latter. The fluid pressure determined by the positioning of the valves 47 and 48 acts upon the lower side of the diaphragm 45 for urging the member 46 upwardly, and this same pressure is supplied to a conduit 55 leading through a valve device 57 to a differential relay, generally designated 58.

In order that the pressure in conduit 55 may be determined partially at least by boiler output, there is provided a conduit 59 conducting pressure fluid to the upper side of the diaphragm 44 under the control of a pilot valve 60 positioned by a device 61, responsive to the pressure in conduit 3. The pilot valve 60 is like the valve 35 but is so connected that the pressure in conduit 59 is increased on downward movement of its valve stem and decreased on upward movement. It will be appreciated that the pressure supplied by conduit 59 to the upper side of the diaphragm 44 will act to move the member 46 downwardly and open the supply valve 47 for increasing the pressure supplied to the conduit 55. When the relay 40 is balanced, the pressure supplied to conduit 55 is equal to the difference between the tension of the spring 54 and the sum of the pressures supplied by conduits 36 and 59.

The valve device 57 is adjustable manually for selectively connecting the differential relay 58 in communication with either the conduit 55 or a fluid supply conduit 63. In normal operation of the system, the valve 57 would be adjusted to connect the relay 58 to the conduit 55. This valve device is disclosed in the patent to Gorrie 2,202,286, and need not be described herein.

The differential relay 58 is like the relay 40 except that it has a conduit 65 connecting the space below the diaphragm 45' in communication with the space at the upper side of this diaphragm past a restricting valve 52'. The pressure in conduit 55 is subjected on the upper side of the diaphragm 44', and the lower side of this diaphragm is subjected to the pressure in a conduit 66 leading from a pump 67 driven by the power unit 6 through pulleys 68, 69 and a belt 70. The pump is adjusted to deliver fluid (such as oil) to the relay 58 at a pressure proportional to the speed of the power unit. The tension of the spring 54' in the relay 58 is adjusted so that the beam 50' is held in a position to close the valves 47' and 48' when the pressure in the steam line 3 is at the desired value and fuel is being supplied at a rate to maintain this value. The conduit 20 is connected to the space beneath the diaphragm 45', and the pressure supplied from this space through conduit 20 to the diaphragm 18 is sufficient to position the valve 15 for driving the power unit 6 at the speed necessary to deliver coal to the furnace in the amount required to maintain the steam pressure.

Even though the pressure in the steam line remains constant there may be some fluctuations of the fuel level in the pulverizer, but these changes in level produce effects which increase or decrease the speed of the feeder so as to return the level to the value that produces the fuel supply needed. An increase in the fuel level results in an increase in pressure drop across the pulverizer. This means that the fuel supply to the pulverizer is greater, and, if permitted to continue, will result in an increase in the boiler output. The increased pressure drop, however, acts through conduits 22 and 23 to move the diaphragm 31 to the left and position the valve 37 so as to reduce the pressure in conduit 36. This reduced pressure acting on diaphragm 45 permits the member 46 to move upwardly so that the beam 50 may be positioned to open the exhaust valve 48 until the pressure supplied to conduit 55 is reduced by an amount equal to the pressure change in conduit 36. The reduced pressure supplied by conduit 55 to the upper side of diaphragm 44' causes the relay 58 to become unbalanced and effect a reduction in the pressure supplied to conduit 20.

When the relay 58 is balanced, the pressures at opposite sides of the diaphragm 45' are equal. Since the pressures supplied to conduit 20 is the same as that acting on the lower side of diaphragm 45', it means that a reduction of the pressure in this space results in pressure passing from the space above diaphragm 45' past the valve 52' and through conduit 65 to the space below the diaphragm. This causes the relay to be continuously unbalanced until either the pressure supplied by conduit 66 to the lower side of diaphragm 44' is reduced by an amount equal to the pressure reduction in conduit 55, or the pressure in conduit 55 is increased. As long as the unbalance continues to exist, the pressure in conduit 20 decreases and permits the valve 15 to move toward its closed position for reducing the supply of steam to the engine 6 and effecting a reduction in its speed. The supply of fuel to the pulverizer and the pressure delivered by the pump 67 are both reduced on reduction of the engine speed. The level of the fuel in the pulverizer will soon be lowered because of the reduced fuel supply, and the valve 37 will be positioned to effect an operation of the relay 40 for increasing the pressure in conduit 55. The reduced pressure supplied by the pump 67, and the increasing pressure supplied by conduit 55 soon return the relay 58 to a balanced condition. Any drop in the fuel level below that necessary to provide the fuel supply needed to maintain the steam pressure results in an operation of the relays to increase the pressure in conduit 20 for opening the valve 15 and speeding up the feeder engine to raise the level in the pulverizer.

If the pressure in the steam line increases for some reason, as for instance a decrease in demand, the device 61 operates immediately to reduce the pressure in conduit 59 and unbalance the relay 40 so that the pressure in conduit 55 is correspondingly reduced. This causes relay 58 to become unbalanced and effect a continuing reduction of the pressure in line 20 so that valve 15 closes and slows down the engine 6. The increased steam pressure also causes the device 26 to operate and move the damper 25 toward its closed position for reducing the supply of air to the pulverizer. The pressure drop across the orifice 24 is then reduced, and the diaphragm 30 moves to the left for positioning the valve 37 and reducing the pressure in conduit 36. Relay 40 operates on the reduction of pressure in conduit 36 to reduce the pressure in conduit 55, and this reduced pressure causes further reduction of the pressure in conduit 20. It will be seen that the change in steam pressure acts both directly through the device 61 and indirectly through the device 26 for regulating the pressure to position the valve 15 and adjust the speed of the feeder engine 6 until the steam pressure is reduced to the desired value. When the air flow to the pulverizer is changed by an adjustment of damper 25, the pressure drops across the pulverizer is also changed, and the action on diaphragm 31 is such as to aid the diaphragm 30 in positioning the pilot valve 37.

Interposed in the conduit 59, between the pilot valve 60 and the devices 40 and 26, is a standardizing relay 80 similar in general to the relay 58. The loading pressure output of pilot valve 60 is impressed upon the A chamber, while the B chamber is open to the atmosphere. The control pressure developed in the D chamber is effective through the conduit 59 upon the A chamber of relay 40 and through conduit 59' upon the device 26. The C and D chambers of the relay 80 are connected through an adjustable bleed valve so that a regenerative standardizing action is obtained as described in the patent to Gorrie Re. 21,804. Such a relay provides a proportional control with reset characteristics. It provides for the final control index (steam pressure) a floating control of high sensitivity superimposed upon a positioning control of relatively low sensitivity. A function of the adjustable bleed connection between chambers C and D is to supplement the primary control effected by pilot 60 with a secondary control of the same or different magnitude as a follow-up or supplementary action to prevent overtravel and hunting.

In general the tachometer 67 provides a representation of speed of the feeder engine 6 and provides a constant speed governor for the engine at whatever loading is established in conduit 57' by either hand or automatic selection of the valve 57. Preferably the tachometer 67 provides an oil pressure in the pipe 66 although the pressure may be that of any suitable fluid. Oil pressure is thus imposed upon the lower side of diaphragm 44' while air pressure is imposed upon its upper side.

The characteristic of a fluid tachometer such as 67 is nearly a straight line relation between oil pressure and speed at low maximum speeds but approaches a parabola as the maximum speed is increased. Preferably I arrange the pulleys 68, 69 so as to use a high speed characteristic and match the generally parabolic curve with the square root characteristic of the meter 30.

Figure 2:
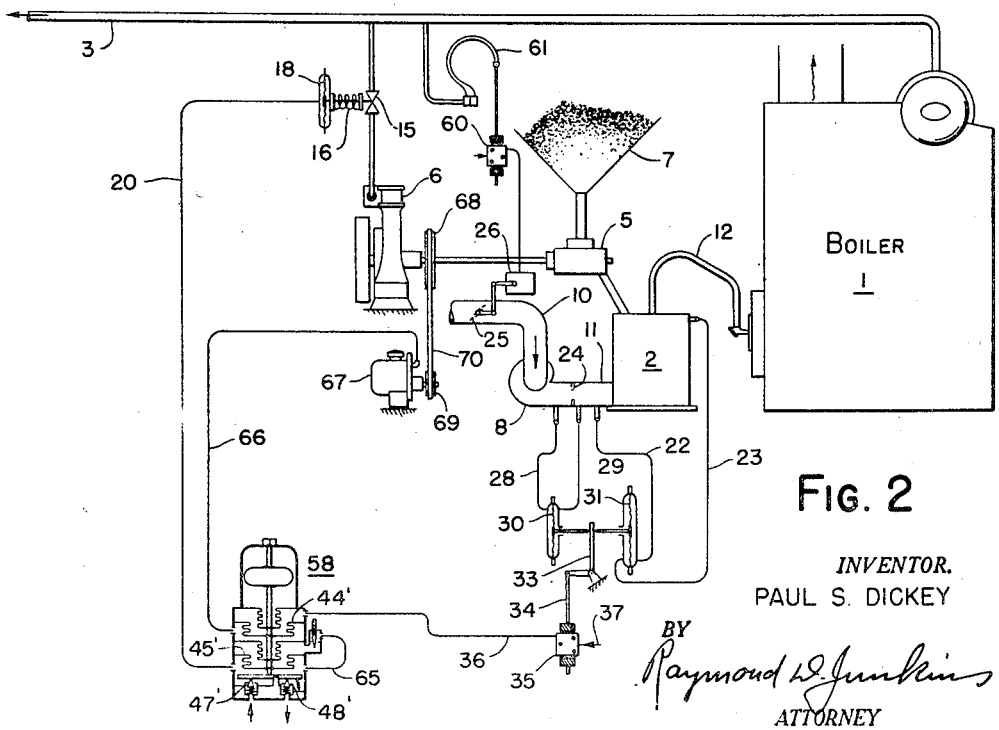
Fig. 2 is a schematic diagram of a system in which the supply of fuel is determined only indirectly by the furnace output.

Fig. 2 shows a system like that of Fig. 1 except that the steam pressure acts only indirectly in controlling the speed of the feeder engine. In this system, the conduit 36 leads from the pilot valve 37 directly to the space at the upper side of the diaphragm 44' in relay 58. The operation is the same as that of Fig. 1, but the system is responsive only to changes in air flow and in the pressure drop across the pulverizer. The air flow is representative of boiler output, and the pressure drop is representative of the fuel supply to the furnace. Again the tachometer 67 provides a constant speed governor for the engine at whatever loading is established in the conduit 36.

While there are shown in this application two forms which my invention may assume in practice, it will be understood that these forms are shown merely for purposes of illustration and that the invention may be modified and embodied in various other forms without departing from its spirit or the scope of the appended claims.

What I claim as new and desire to secure by Letters Patent of the United States, is:

1. A system for variably feeding fuel to the furnace of a steam generating boiler comprising, in combination, a pulverizer communicating with said furnace, means for feeding fuel to said pulverizer, means discharging air through said pulverizer for carrying pulverized fuel to the furnace, means for producing a first force by the air flow to said pulverizer representative of the rate of such flow, means for producing a second force by the flow of air and pulverized fuel representative of the fuel supply to the furnace, means subjected to said first and second forces for producing a third force, means for producing a fourth force proportional to the rate of operation of said feeding means, a relay subjected to said third and fourth forces and operative to produce a fifth force, means for controlling said feeding means in response to said fifth force, and means responsive to the steam generated for controlling the supply of air to said pulverizer.

2. A system for variably feeding fuel to the furnace of a steam generating boiler comprising, in combination, a pulverizer communicating with said furnace, means for feeding fuel to said pulverizer, a power unit for driving said feeding means, means discharging air through said pulverizer for carrying pulverized fuel to the furnace, means producing differential pressures separately representative of air flow and fuel flow to said furnace and other means operating to produce a force representative of the relation between such pressure differentials, means driven by said power unit for producing a force representative of the rate of operation of said fuel feeding means, means responsive to said forces for controlling the operation of said power unit, and means responsive to the pressure of the steam generated for controlling the supply of air to said pulverizer.

3. A system for variably feeding fuel to the furnace of a steam generating boiler comprising, in combination, a pulverizer communicating with said furnace, means for feeding fuel to said pulverizer, a power unit for driving said feeding means, means discharging air through said pulverizer for carrying pulverized fuel to the furnace, means producing differential pressures separately representative of air flow and fuel flow to said furnace and other means operating to produce a force representative of the relation between such pressure differentials, means driven by said power unit for producing a force representative of the rate of operation of said fuel feeding means, a differential relay subjected to said forces and operative on a change in their differences from a predetermined value for producing a pressure changing continuously in value, means responsive to said pressure for controlling the supply of operating fluid to said power unit, and means responsive to the pressure of the steam generated for controlling the supply of air to said pulverizer.

4. A system for variably feeding fuel to the furnace of a steam generating boiler comprising, in combination, a pulverizer communicating with said furnace, means for feeding fuel to said pulverizer, a power unit for driving said feeding means, means discharging air through said pulverizer for carrying pulverized fuel to the furnace, means producing differential pressures separately representative of air flow and fuel flow to said furnace and other means operating to produce a force representative of the relation between such pressure differentials, means for producing a force proportional to the pressure of the steam generated, a differential relay subjected to said forces and producing a first pressure proportional to their sums, means driven by said power unit for producing a second pressure proportional to its operating speed, and means responsive to said first and second pressures for controlling the operation of said power unit.

5. A system for variably feeding fuel to the furnace of a steam generating boiler comprising, in combination, a pulverizer communicating with said furnace, means for feeding fuel to said pulverizer, a power unit for driving said feeding means, means discharging air through said pulverizer for carrying pulverized fuel to the furnace, means producing differential pressures separately representative of air flow and fuel flow to said furnace and other means operating to produce a force representative of the relation between such pressure differentials, means for producing a force proportional to the pressure of the steam generated, a differential relay subjected to said forces and producing a first pressure proportional to their sums, means driven by said power unit for producing a second pressure proportional to its operating speed, a differential relay subjected to said first and second pressures and operating to produce a third pressure varying with changes in the difference between the first and second pressures from a predetermined value, and means responsive to said third pressure for controlling the supply of operating fluid to said power unit.

6. A system for variably feeding fuel to the furnace of a steam generating boiler comprising, in combination, a pulverizer communicating with said furnace, means for feeding fuel to said pulverizer, a power unit for driving said feeding means, means discharging air through said pulverizer for carrying pulverized fuel to the furnace, means producing differential pressures separately representative of air flow and fuel flow to said furnace and other means operating to produce a force representative of the relation between such pressure differentials, means for producing a force proportional to the pressures of the steam generated, a differential relay subjected to said forces and producing a first pressure proportional to their sums, means driven by said power unit producing a second pressure proportional to its operating speed, means responsive to said first and second pressures for controlling the supply of operating fluid to said power unit, and means responsive to the pressure of the steam generated for controlling the supply of air to said pulverizer.

7. A system for variably feeding fuel to the furnace of a steam generating boiler comprising, in combination, a pulverizer communicating with said furnace, means for feeding fuel to said pulverizer, a power unit for driving said feeding means, means discharging air through said pulverizer for carrying pulverized fuel to the furnace, means producing differential pressures separately representative of air flow and fuel flow to said furnace and other means operating to produce a force representative of the relation between such pressure differentials, means for producing a force proportional to the pressures of the steam generated, a differential relay subjected to said forces and producing a first pressure proportional to their sums, means driven by said power unit for producing a second pressure proportional to its operating speed, a differential relay subjected to said first and second pressures and operating to produce a third pressure varying continuously on changes in the difference between the first and second pressures from a predetermined value, and means responsive to the pressure of the steam generated for controlling the supply of air to said pulverizer.

8. A system for variably feeding fuel to the furnace of a steam generating boiler comprising, in combination, a pulverizer communicating with said furnace, means for feeding fuel to said pulverizer, a steam engine for driving said feeding means, means for supplying steam to said engine from said boiler, means for discharging air through said pulverizer for carrying pulverized fuel to the furnace, means producing differential pressures separately representative of air flow and fuel flow to said furnace and other means operating to establish a fluid pressure representative of the relation between such pressure differentials, a pump driven by said steam engine and operating to deliver fluid at a pressure proportional to its speed, a differential relay subjected to said fluid pressures and operating to deliver fluid at a pressure varying on changes in the difference between said fluid pressures from a predetermined value, and means responsive to the pressure of the fluid delivered by said relay for controlling the supply of steam to said engine.

9. The system of claim 8 in which means are provided for controlling the supply of air to said pulverizer in response to the pressure of the steam generated.

10. A system for variably feeding fuel to the furnace of a steam generating boiler comprising, in combination, a pulverizer communicating with said furnace, means for feeding fuel to said pulverizer, a steam engine for driving said feeding means, means for supplying steam to said engine from said boiler, means for discharging air through said pulverizer for carrying pulverized fuel to the furnace, means producing differential pressures separately representative of air flow and fuel flow to said furnace and other means operating to establish a fluid pressure representative of the relation between such pressure differentials, means for establishing a fluid pressure proportional to the pressure of the steam generated, a relay subjected to said established fluid pressures and operating to deliver fluid at a pressure proportional to their sums, a pump driven by said steam engine and operating to deliver fluid at a pressure proportional to its speed, a second relay subjected to the fluid pressures delivered by said first relay and said pump and operating to deliver fluid at a pressure varying on changes in their differences from a predetermined value, and means responsive to the fluid pressure from said second relay for controlling the supply of steam to said engine.

11. The system of claim 10 in which means are provided for controlling the supply of air to said pulverizer in response to the pressure of the steam generated.

P. S. DICKEY.

REFERENCES CITED

The following references are of record in the file of this patent:

UNITED STATES PATENTS

| Number | Name | Date |
| --- | --- | --- |
| 1,567,869 | Scofield | Dec. 29, 1925 |
| 1,967,988 | Dickey | July 24, 1934 |
| 2,012,934 | Hardgrove | Aug. 27, 1935 |
| 2,212,125 | Peebles | Aug. 20, 1940 |
| 2,404,937 | Anderson | July 30, 1946 |
| 2,439,721 | Dickey | Apr. 13, 1948 |